(12) United States Patent
Li

(10) Patent No.: US 7,568,658 B2
(45) Date of Patent: Aug. 4, 2009

(54) AIRCRAFT EMERGENCY LANDING ASSIST VEHICLE

(76) Inventor: Maxwell W. Li, 4663 Lehigh Dr., Troy, MI (US) 48098

( * ) Notice: Subject to any disclaimer, the term of this patent is extended or adjusted under 35 U.S.C. 154(b) by 429 days.

(21) Appl. No.: 11/398,085

(22) Filed: Apr. 5, 2006

(65) Prior Publication Data
US 2007/0235586 A1 Oct. 11, 2007

(51) Int. Cl.
*B64F 1/00* (2006.01)
(52) U.S. Cl. .................................. 244/110 E; 244/116
(58) Field of Classification Search ............. 244/100 R, 244/110 E, 114 R, 116, 1 R
See application file for complete search history.

(56) References Cited

U.S. PATENT DOCUMENTS

| | | | |
|---|---|---|---|
| 1,164,967 A | 12/1915 | Thorp | |
| 1,830,228 A | 11/1931 | Glennan | |
| 2,246,716 A | 6/1941 | Bottrill | |
| 2,346,633 A | 4/1944 | Bottrill | |
| 2,425,886 A | 8/1947 | Knox | |
| 2,783,005 A | 2/1957 | Kane | |
| 2,923,504 A * | 2/1960 | Ortega et al. | 244/114 R |
| 3,003,717 A * | 10/1961 | Booker | 244/2 |
| 3,128,066 A | 4/1964 | Bailey | |
| 3,210,029 A | 10/1965 | Brusch et al. | |
| 3,380,690 A | 4/1968 | Rego | |
| 3,490,722 A | 1/1970 | Schnarr et al. | |
| 3,567,159 A | 3/1971 | Klein | |
| 4,397,254 A * | 8/1983 | Deady | 114/261 |
| 4,653,706 A | 3/1987 | Ragiab | |
| 5,102,091 A * | 4/1992 | Craig | 244/116 |
| 5,170,966 A | 12/1992 | Sheu | |
| 6,394,391 B1 | 5/2002 | Lo | |
| 6,695,255 B1 | 2/2004 | Husain | |
| 2008/0308673 A1* | 12/2008 | Liu | 244/110 R |

FOREIGN PATENT DOCUMENTS

DE 202006018006 U1 * 5/2007

OTHER PUBLICATIONS

"B-52 Stratofortress" Wikipedia, the Free Encyclopedia, Jan. 4 2009 http://en.wikipedia.org/wiki/B-52_Stratofortress.*
"Undercarriage Arrangements" Wikipedia, the Free Encyclopedia, Nov. 11, 2008 http://en.wikipedia.org/wiki/Undercarriage_arrangements.*
"Hawker Siddeley Harier" Wikipedia, the Free Encyclopedia, Dec. 1, 2008 http://en.wikipedia.org/wiki/Hawker_Siddeley_Harrier.*

* cited by examiner

*Primary Examiner*—Michael R Mansen
*Assistant Examiner*—Joseph W Sanderson
(74) *Attorney, Agent, or Firm*—Frederick W. Mau, II

(57) ABSTRACT

An aircraft emergency landing assist vehicle for assisting an aircraft during an emergency landing where one or more of the retractable wheels of the aircraft landing gear is damaged, has failed to extend, or is only partially extended from the aircraft wing or fuselage. During an emergency aircraft landing, the landing assist vehicle supports one of the wings or the fuselage of the aircraft proximate to the malfunctioning landing gear wheel.

10 Claims, 4 Drawing Sheets

AIRCRAFT EMERGENCY LANDING ASSIST VEHICLE

FIELD OF THE INVENTION

The present invention generally relates to a system for assisting the landing of an aircraft during an emergency landing. More particularly, the present invention relates to a vehicle which assists an aircraft during an emergency landing as a result of a landing gear malfunction.

BACKGROUND

Air travel is one of the foremost modes of transportation used throughout the world. Everyday aircraft are used for commercial travel, personal travel, transport of cargo, military operations, and many more applications. While the chances of aircraft landing gear malfunctioning during landing is low, when taking into account the number of times aircraft are used on a daily basis coupled with the significant risk to the passengers, cargo, and the area surrounding the runway, the malfunctioning of aircraft landing gear is a significant problem that requires attention.

While aircraft differ in size and design, the landing gear for different types of aircraft is substantially similar. Typical aircraft landing gear includes one or two wheels attached to a retractable arm mounted on the nose of the fuselage of the aircraft, and one or two wheels attached to a retractable arm mounted on the bottom of the left aircraft and the bottom or the right aircraft wing. As is the case with many aircraft, the landing gear may be retracted into the fuselage and wings during flight. During flight, the landing gear remains retracted and placed either against the aircraft or safely stored within the aircraft. During the landing of an aircraft, the landing gear is extended thereby enabling the aircraft to land safely on a runway.

Various systems for aiding in the landing of an aircraft with malfunctioning landing gear have been disclosed in the prior art. Many of the prior art systems are very large and receive the entire aircraft upon landing. Examples of these types of systems are described in detail in U.S. Pat. Nos. 6,695,255; 6,394,391; 4,653,706; and 3,567,159.

U.S. Pat. No. 6,695,255 discloses a system for absorbing impact and cushioning an aircraft landing. The system comprises a plurality of wheeled segments coupled into a line, a steerable head unit, and a drive means. During use, the line of segments is positioned on a runway strip. As the aircraft approaches, the drive means propels the segments along the runway. Preferably, the speed of the segments matches that of the aircraft. The aircraft is then piloted to land on the plurality of segments. A braking system is then used to stop the plurality of segments once the aircraft has landed on the segments.

U.S. Pat. No. 6,394,391 discloses a landing truck for receiving an aircraft in a forced landing. The landing truck comprises a wheeled vehicle, a front steering compartment, and a rear compartment for synchronously controlling and steering the landing truck, a landing frame placed on the vehicle, a trapping unit, a cushioning unit, a supporting and balancing unit, and an automatic controlling unit. The landing frame is placed on the top of the vehicle and can be tipped by hydraulic jacks in cooperation with the landing angle of the aircraft. During use, the landing frame receives the landing aircraft. The trapping and cushioning unit are mounted on the landing frame for absorbing impact and vibration of the aircraft landing on the frame U.S. Pat. No. 4,653,706 discloses an emergency landing device having a base with a concave upper surface for receiving and supporting the fuselage of an aircraft. The length of the base is preferably twice the length of the aircraft being received. Wheels are mounted on the base for allowing the base to roll down an airport runway and a propulsion means is provided for propelling the device to an appropriate speed for receiving the incoming aircraft. The device is powered by an electric motor which is preferably radio controlled to allow remote control of the speed and direction of the landing device. Upon notification of an emergency landing, the selected runway would be cleared and the electric motor would be actuated to propel the device down the runway. As the device gains speed, the aircraft would descend over the device and attempt to land on the concave upper surface as the speed of the device approaches that of the aircraft.

U.S. Pat. No. 3,567,159 discloses a landing device for emergency use by aircraft having damaged or inoperable landing gear. The device comprises a vehicle having an elongated body which receives and supports the full weight of the aircraft via the wing structure and fuselage of the airplane. The device includes cushion means of the inflatable type to receive the fuselage of the aircraft. Separate means are provided for engaging and supporting the wing structure of the aircraft. During an emergency landing, the device is brought up to the speed of the aircraft. After landing of the aircraft on the vehicle, the speed of the vehicle is reduced via braking means.

While many systems have been designed to aid in the landing of aircraft with malfunctioning landing gear, there is still a need for improvements in such systems. The prior art systems are all designed for receiving the entire aircraft upon landing resulting is a very large and bulky system. Due to their size, the prior art landing systems are very costly making their widespread use unpractical, especially for smaller noncommercial airfields. The size of the landing systems also adversely affects the maneuverability and the ability of the system to properly attach to the landing aircraft. Furthermore, the size of the prior art systems are impractical on smaller airfields and require large amounts of power during operation. The present invention overcomes a number of shortcomings in the prior art by providing a smaller compact system for aiding in the landing of aircraft which allows for widespread use.

SUMMARY OF THE INVENTION

Disclosed herein, is an landing assist vehicle for assisting an aircraft during an emergency landing where the landing gear on one of the wings or the fuselage of the aircraft has malfunctioned. The landing assist vehicle in accordance with the present invention is much smaller in size than those of the prior art as the present invention is designed to engage and support only the fuselage or one of the wings of the landing aircraft instead of receiving the entire aircraft. The size of the present invention makes the present invention less expensive in cost and operation thereby allowing for widespread use. The size of the landing assist vehicle also allows for greater maneuverability with respect to the landing aircraft as the vehicle will be able to achieve the speed of the landing aircraft and position itself with respect to the plane in less time than the landing systems disclosed in the prior art.

The landing assist vehicle comprises a vehicle chassis, two or more mechanical arms supported by said vehicle chassis, securing means for securing one or more of the mechanical arms to the aircraft at a position proximate to the malfunctioning landing gear of said aircraft, one or more cushioning members, steering means for controlling the direction of the vehicle, and propulsion means for propelling the landing assist vehicle at a speed proximate to the speed of the landing aircraft.

The securing means and the one or more cushioning members being disposed on the upper portion one or more of the mechanical arms. The cushioning members allow the one or mechanical arms to support the aircraft at a position proximate to the malfunctioning landing gear wheel. The securing means may comprise a mechanical clamp, a hook, or combination thereof. The securing means and/or cushioning member may be rotatably connected and/or pivotally connected to the upper portion of said one or more mechanical arms.

The vehicle chassis having an upper side, a lower side, a front end, a rear end, and a recessed portion which accommodates the malfunctioning landing gear wheel of said aircraft. The propulsion means may comprise a drive system including an internal combustion engine, an electric motor, or a combination thereof. Alternatively, the propulsion means may comprise a cable and winch assembly or another vehicle which pulls the landing assist vehicle along the runway at a speed proximate to the landing aircraft. One or more of the propulsion means, the steering means, and the one or more mechanical arms may be controlled via remote control.

The landing assist vehicle may further comprise a control system which controls one or more of the propulsion means, the steering means, and the one or more mechanical arms. The control system may comprise one or more sensors and a data processing system. The one or more sensors measure the speed and position of the aircraft with respect to the landing assist vehicle. One or more of the sensors may be disposed on the upper portion of one or more of said mechanical arms, said one or more sensors disposed on the upper portion of said mechanical arms detecting contact with between said aircraft and one or more of said mechanical arms and the force applied by the aircraft on one or more of said mechanical arms.

The aircraft emergency landing assist vehicle may further comprise a monitoring system. The monitoring system may comprise one or more cameras and one or more displays. The one or more cameras providing images of the aircraft during landing which are viewed on the one or more displays.

DETAILED DESCRIPTION OF THE PREFERRED EMBODIMENTS OF THE INVENTION

In accordance with the present invention there is provided an aircraft emergency landing assist vehicle. During an emergency landing where one or more of the retractable wheels of the aircraft landing gear is damaged, has failed to extend, or is only partially extended from one of the wings or fuselage of an aircraft, the landing assist vehicle supports one of the wings or the fuselage of the aircraft proximate to the malfunctioning landing gear wheel. As such, the emergency landing assist vehicle acts as a replacement to the malfunctioning landing gear wheel and allows for safe landing of the aircraft. The emergency aircraft landing assist vehicle allows for a much smaller design as the vehicle is designed to only secure a portion of the landing aircraft instead of receiving the entire aircraft. Furthermore, the design of the emergency landing assist vehicle allows for widespread use due to lower construction costs and operating costs due and may be used with aircraft of all sizes.

Figure 1:
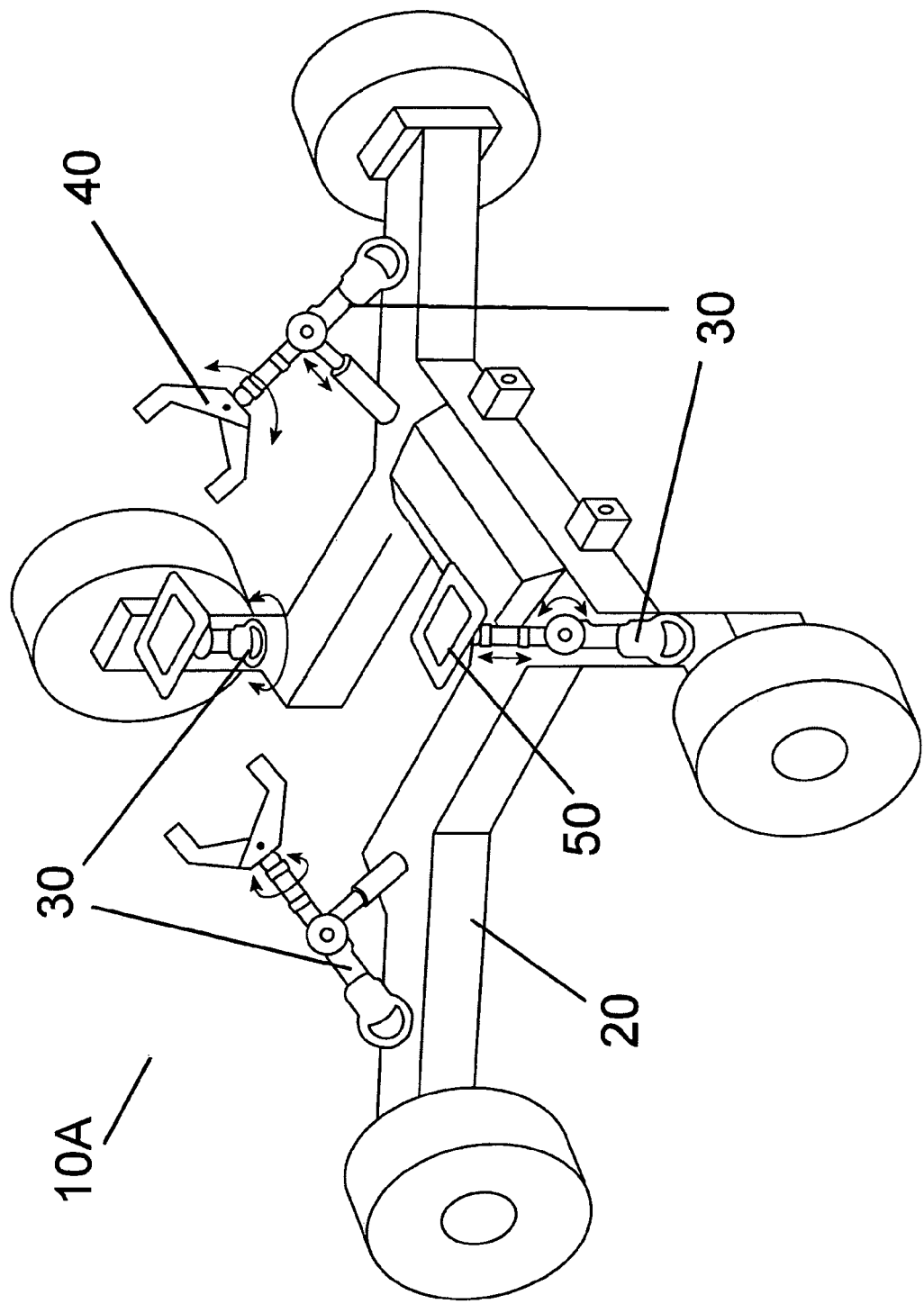
FIG. 1, is a depiction of a first embodiment of a landing assist vehicle in accordance with the present invention.
Figure 2:
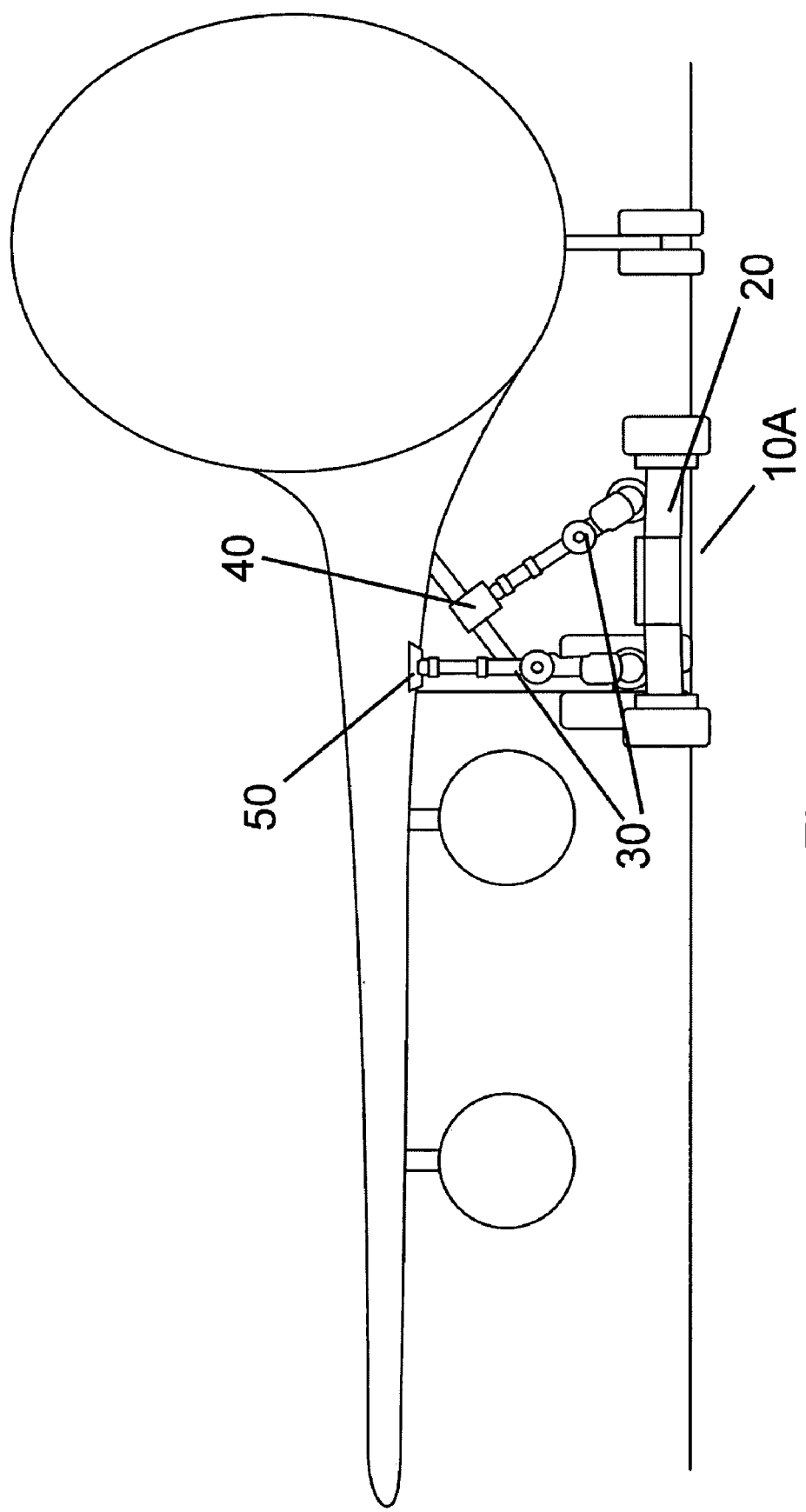
FIG. 2, is a depiction of the landing gear as shown in FIG. 1 being used to support one of the wings of an aircraft proximate to the landing gear.
Figure 3:
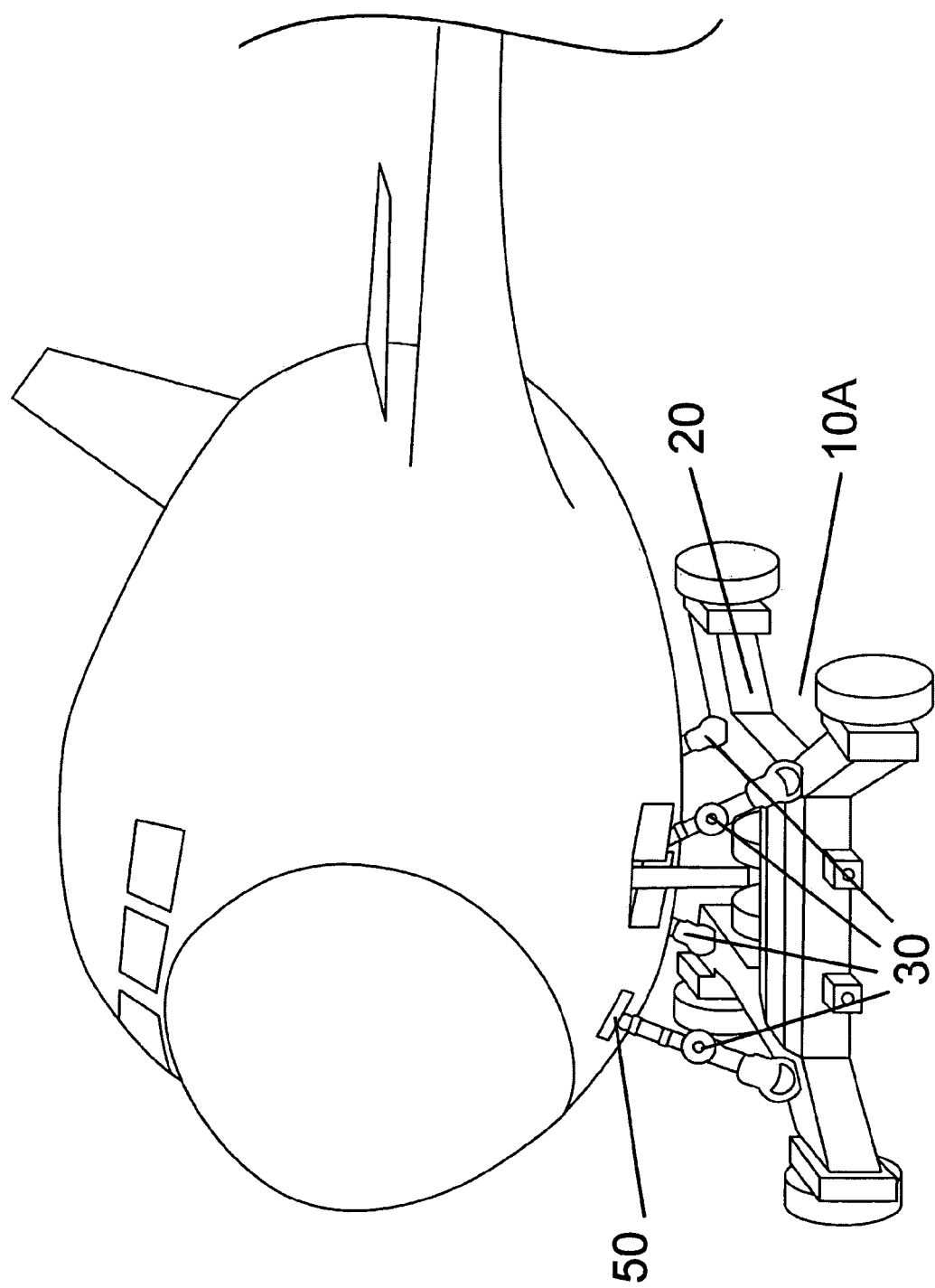
FIG. 3, is a depiction of the landing gear as shown in FIG. 1 being used to support the fuselage of an aircraft proximate to the landing gear.

FIG. 1, is a depiction of a preferred embodiment of the landing assist vehicle 10A in accordance with the present invention. The landing assist vehicle 10A generally comprises a vehicle chassis 20 and one or more mechanical arms 30 supported by the vehicle chassis 20. The one or more mechanical arms 30 support the aircraft during landing at a position proximate to the malfunctioning landing gear wheel. FIG. 2, is a depiction of the landing assist vehicle 10A in accordance with the present invention supporting an aircraft wing at a position proximate to the landing gear wheel. FIG. 3, is a depiction of the landing assist vehicle 10A in accordance with the present invention supporting an aircraft fuselage at a position proximate to the landing gear wheel.

The landing assist vehicle 10A further comprises propulsion means for propelling the landing assist vehicle along the runway at a speed proximate to that of the landing aircraft, braking means for decelerating the vehicle, and steering means for controlling the direction of the vehicle. The landing assist vehicle may further include a monitoring system which allows operators to view the landing aircraft from the perspective of the landing assist vehicle and/or a control system for controlling the steering means, the propulsion means, the mechanical arms, or any combination thereof with respect to the aircraft during landing.

The vehicle chassis 20 in accordance with the present invention may vary in size and shape. The vehicle chassis 20 may be constructed from any rigid material able to support the portion of the aircraft in contact with the one or more mechanical arms 30. The vehicle chassis has at least 3 wheels attached thereto. The wheels may be attached to the vehicle chassis via shocks and/or struts which aid in stabilization of the vehicle during use. The vehicle chassis is preferably designed to accommodate the malfunctioning landing gear wheel of an aircraft which allows the aircraft to be received by the landing assist vehicle when the malfunctioning landing gear wheel is at least partially extended. Preferably at least a portion of the rear of the vehicle chassis has a recess which accommodates the at least partially extended malfunctioning landing gear when the aircraft is supported by the landing assist vehicle.

The one or more mechanical arms 30 may be any mechanical arm generally known in the prior art that extends and contracts as needed. The one or more mechanical arms may extend or contract via one or more hydraulic pumps and/or mechanical motors. Each of the mechanical arms have a lower portion attached to the vehicle chassis and an upper portion opposite the lower portion. The mechanical arms 30 may be raised or lowered from the vehicle chassis 20 via one or more mechanical motors or hydraulic pumps. During operation, the one or more mechanical arms may be controlled manually by an on-board operator, by remote control, or by a vehicle control system.

At least one of the one or more mechanical arms 30 may comprise securing means disposed on the distal end of the one or more mechanical arms opposite the vehicle chassis. The securing means 40 secure the mechanical arm to the malfunctioning landing gear or a portion of the aircraft proximate to the malfunctioning aircraft landing gear during an emergency landing. The securing means 40 may comprise a mechanical clamp, hook, or combination thereof. The mechanical clamp may clench the malfunctioning retractable arm of the landing gear or a portion of the aircraft in close proximity to the malfunctioning retractable arm. The hook may secure one or more mechanical arms to the aircraft by hooking the front and/or rear of the aircraft wing. The mechanical clamp or hook may be rotatably connected to the upper portion of the mechanical arm such that the clamp or hook rotates about the rotational axis of the mechanical arm. The mechanical clamp or hook may also be pivotally coupled to the upper portion of the mechanical arm thereby providing the mechanical clamp with a hemispherical range of motion with respect to the mechanical arm.

Alternatively or in addition to the securing means, a cushioning member 50 may be disposed on the distal end of one or more of the mechanical arms opposite the vehicle chassis. The cushioning member 50 may be flat or concave to better receive and contact the aircraft. The cushioning member supports a portion of the aircraft proximate to the malfunctioning landing gear. The cushioning member may be rotatably connected to the upper portion of the mechanical arm such that the cushioning member rotates about the rotational axis of the mechanical arm. The cushioning member 50 may also be pivotally coupled to the upper portion of the mechanical arm such that the cushioning member has a hemispherical range of motion with respect to the mechanical arm. The cushioning member may be comprised of any type of cushioning material which absorbs at least a portion of the vertical and horizontal impact and vibration from the aircraft.

Figure 4:
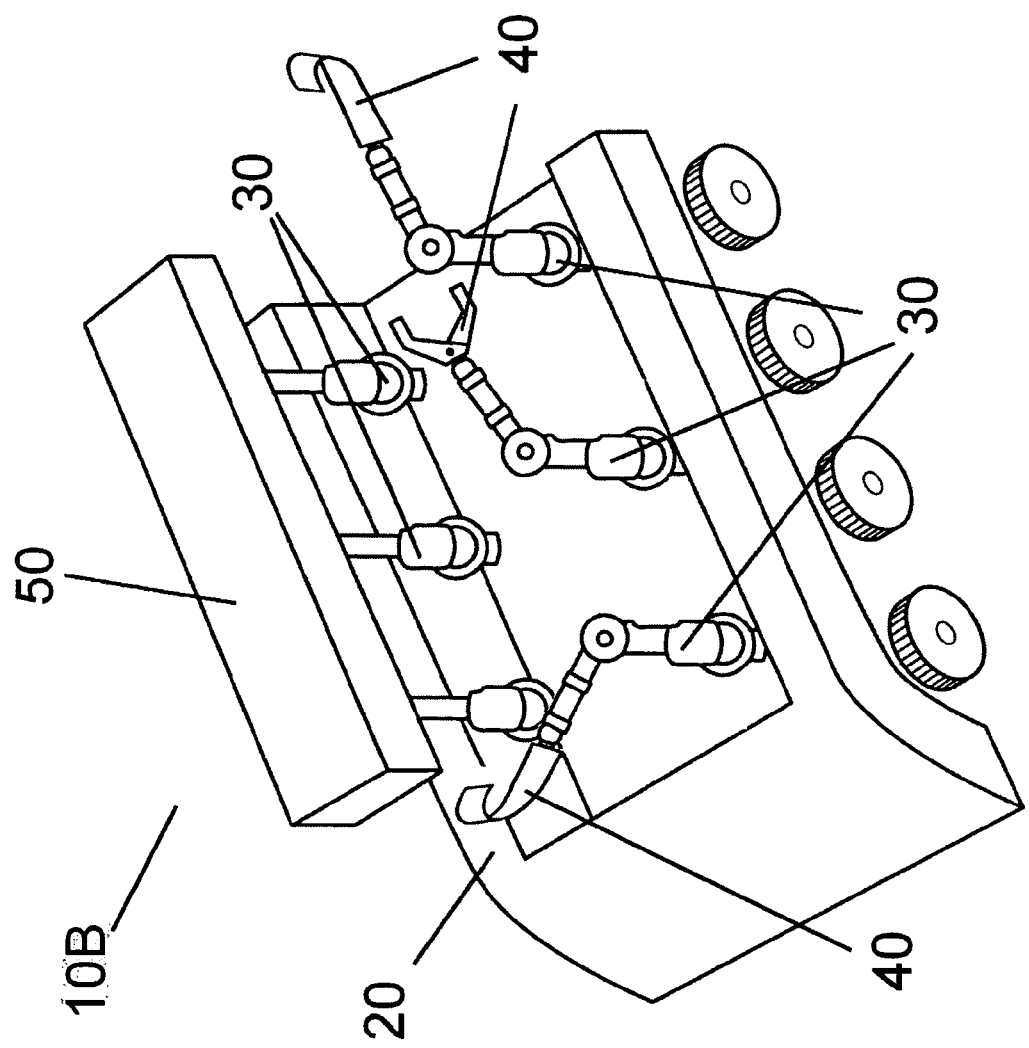
FIG. 4, is a depiction of a second embodiment of a landing assist vehicle in accordance with the present invention.

The landing assist vehicle may comprise any combination of mechanical clamps, hooks, or cushioning members to engage and support the aircraft during landing. The combination of mechanical clamps, hooks, or cushioning members may be determined upon communication with the aircraft regarding the state of the landing gear (i.e. fully extended, partially extended, unextended). One or more cushioning members may also be supported by two or more of the mechanical arms. FIG. 4, is a depiction of an alternative embodiment 10B of the present invention which utilizes a cushioning member, a mechanical clamp and hooks to secure the aircraft to the landing assist vehicle.

During landing, when one or more of the mechanical arms is secured to or in contact with the aircraft, one or more of the remaining mechanical arms may extend until brought into contact with the aircraft thereby providing additional support. The one or more mechanical arms may then be raised or lowered such that the aircraft will remain properly balanced during landing.

The propulsion means may be any type system which propels the landing assist vehicle along the aircraft runway at a speed proximate to that of the landing aircraft. During operation, the propulsion means may be controlled manually by an on-board operator, by remote control, or by a vehicle control system. The propulsion means may be a drive system mounted on the vehicle chassis. The drive system may include an internal combustion engine, an electric motor, or a combination thereof in mechanical communication with one or more of the wheels attached to the vehicle chassis. The internal combustion engine may be fueled with gasoline, diesel fuel, natural gas, hydrogen, or any other combustible fluid. The electric motor may be powered by one or more batteries, one or more fuel cells, one or more solar cells, or any combination thereof.

Alternatively, the propulsion means may comprise a cable and winch assembly or a towing vehicle, which pulls the landing assist vehicle along the runway. The cable and winch assembly comprises a cable having a first end and a second end and a winch disposed at the end of an aircraft runway. The first end of the cable is coupled to the winch and the second end of the cable is attached to the front of the vehicle chassis. The cable may be attached to the front of the vehicle chassis by any suitable means. To propel the landing assist vehicle along the runway, the winch retracts the cable thereby pulling the landing assist vehicle along the runway. The cable should be of sufficient strength for pulling the weight of the landing assist vehicle while supporting the aircraft. The towing vehicle may be any vehicle capable of pulling the landing assist vehicle at a speed proximate to the speed of the landing aircraft.

The vehicle further comprises steering means for controlling the direction of the vehicle. The steering means may be any type device or mechanism for controlling the direction of the vehicle. The steering means is in mechanical communication with one or more of the wheels attached to the vehicle chassis and causes one or more of the wheels to pivot thereby changing the direction of the landing assist vehicle. During operation, the steering means may be controlled manually by an on-board operator, by remote control, or by a vehicle control system.

The control system may control the propulsion means, the steering means, the mechanical arms, or any combination thereof. The control system generally comprises a data processing system and one or more sensors disposed on the landing assist vehicle. One or more of the sensors may be positioned about the landing assist vehicle to detect the speed and position of the landing aircraft with respect to the landing assist vehicle. One or more sensors may also be disposed on one or more of the mechanical arms to detect contact with the aircraft by one or more of the mechanical arms and the force applied by the aircraft on the one or more mechanical arms.

The control system may further comprise an imaging system. The imaging system may be any type system which detects and maps the area of the aircraft proximate the malfunctioning landing gear during landing of the aircraft. The imaging system provides a signal based on the physical structure of the area proximate the malfunctioning landing gear to the data processor which guides one or more of the mechanical arms with respect to the landing aircraft thereby allowing one or more of the mechanical arms to engage the malfunctioning aircraft landing gear or a portion of the aircraft proximate to the malfunctioning aircraft landing gear.

The data processing system receives signals from the sensors and/or the imaging system and controls the propulsion means, the steering means, the mechanical arms or any combination thereof based on the signals. The data processor may be any type system which receives and processes the data from the one or more sensors and/or the imaging system and controls the propulsion means, the steering means, and/or the one or more mechanical arms based on the processed data.

The landing assist vehicle may also include a monitoring system for providing images from one or more viewing angles to one or displays located onboard or off-board the vehicle. The monitoring system generally comprises one or more cameras and one or more display monitors. The one or more cameras send images to one or more display monitors which allows the aircraft to be viewed during landing. The monitoring system allows one or more operators to view the landing aircraft from the perspective of the landing assist vehicle thereby allowing the one or more operators to control the speed and direction of the landing assist vehicle, either manually or by remote control, with respect to the landing aircraft.

During an emergency aircraft landing whereby a landing gear wheel is malfunctioning, the landing assist vehicle is positioned at the beginning of the runway. As the aircraft approaches, the landing assist vehicle is accelerated to a speed proximate to that of the landing aircraft. The aircraft speed may be communicated to the landing assist vehicle operators and/or the aircraft speed may be determined via one or more sensors. As the aircraft is about to land, the landing assist vehicle positions itself under the aircraft via the steering mean at a position proximate to the malfunctioning landing gear. As the aircraft nears the ground, one or more of the mechanical arms extend and engage the landing gear or an area proximate to the landing gear. When the mechanical arms are guided by a control system, the imaging system maps the landing gear and wing structure and provides a signal to the control system detailing the physical structure of the landing gear and the area proximate to the landing gear. The control system then guides one or more of the mechanical arms such that the landing gear or a portion of the aircraft proximate to the landing gear is engaged based on the landing gear structure. When the mechanical arms are guided either manually or by remote control, the monitoring system provides a display of the malfunctioning landing gear to an operator allowing the operator to guide the mechanical arms to engage the landing gear or a portion of the aircraft proximate to the landing gear. Once the malfunctioning landing gear or area of the plane proximate to the malfunctioning landing gear is engaged, the mechanical arms support the aircraft and maintain proper balance of the aircraft as the non-malfunctioning aircraft landing gear wheels contact the runway. When the aircraft contacts the runway, the landing assist vehicle remains engaged with the aircraft and decelerates at the same rate as the aircraft.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A vehicle for assisting an aircraft during an emergency landing due to a malfunctioning landing gear wheel comprising:
   a vehicle chassis having a recessed portion which receives and accommodates said malfunctioning landing gear wheel of said aircraft, said recessed portion configured to surround said malfunctioning landing gear wheel on three sides;
   two or more mechanical arms supported by said vehicle chassis;
   one or more securing mechanisms, each of said one or more securing mechanisms being rotatably and pivotally attached to the distal end of one of said mechanical arms, said one or more securing mechanisms comprising one or more mechanical clamps, said one or more mechanical clamps securing one or more of said mechanical arms to a portion of said aircraft;
   one or more cushioning members, each of said one or more cushioning members attached to the distal end of a remaining one or more of said mechanical arms;
   steering means for controlling the direction of said vehicle; and
   propulsion means for propelling said vehicle.

2. The landing assist vehicle according to claim 1, wherein one or more of said securing mechanisms further comprise a hook.

3. The landing assist vehicle according to claim 1, wherein at least one of said one or more cushioning members are rotatably connected to the distal end or one of said one or more mechanical arms.

4. The landing assist vehicle according to claim 1, wherein said propulsion means comprises a drive system including an internal combustion engine, an electric motor, or a combination thereof.

5. The landing assist vehicle according to claim 1, wherein said propulsion means comprises a cable and winch assembly.

6. The landing assist vehicle according to claim 1, wherein said propulsion means is a towing vehicle.

7. The landing assist vehicle according to claim 1, wherein one or more of said propulsion means, said steering means, and said one or more mechanical arms are controlled via remote control.

8. The landing assist vehicle according to claim 1, wherein said one or more cushioning members are pivotally connected to the distal end of one or more of said mechanical arms.

9. The landing assist vehicle according to claim 1, wherein one or more of said cushioning members are pivotally and rotatably connected to the distal end of said one or more mechanical arms.

10. The landing assist vehicle according to claim 1, wherein said recessed portion surrounds the malfunctioning landing gear wheel on only three sides.

* * * * *